July 9, 1968   J. W. HARRISON ET AL   3,392,058
HEAT TRANSFER ARRANGEMENT WITHIN A FUEL CELL STRUCTURE
Filed Aug. 27, 1963   4 Sheets-Sheet 1

INVENTORS
JOHN W. HARRISON
PHILIP DANTOWITZ
WILLIAM A. HOLMES

BY

ATTORNEY

INVENTORS
JOHN W. HARRISON
PHILIP DANTOWITZ
WILLIAM A. HOLMES

BY Harold A. Levey, Jr.

ATTORNEY 3,392,058
HEAT TRANSFER ARRANGEMENT WITHIN
A FUEL CELL STRUCTURE
John W. Harrison, Danvers, William A. Holmes, Marblehead, and Philip Dantowitz, Peabody, Mass., assignors to General Electric Company, a corporation of New York
Filed Aug. 27, 1963, Ser. No. 304,910
10 Claims. (Cl. 136—86)

This invention relates to an improved fuel cell construction. More particularly, it relates to a fuel cell having a non-circulating electrolyte in which the moisture content of the electrolyte is automatically controlled to improve efficiency of operation while preventing self-destruction of the cell.

The invention is of a particular importance in fuel cells having non-circulating electrolytes such as ion exchange membranes. The use of an ion-exchange membrane as the electrolyte in a fuel cell is disclosed by W. T. Grubb, Jr. in U.S. Patent No. 2,913,511. In a fuel cell of this type, as indicated in Niedrach application, Ser. No. 850,589, filed Nov. 3, 1959, now patent No. 3,134,697, assigned to the assignee of the present invention, the electrodes are integrally bonded to the faces of the membrane and a fuel, e.g., hydrogen, is applied to one electrode and an oxidant, i.e., oxygen, is applied to the other. The membrane may be anion- or cation-permeable. In the latter case, the fuel is ionized at the anode, and the ions pass through the membrane to the other side where they react with oxygen at the cathode. Where hydrogen and oxygen are used, the product of this reaction is water. With an anion-permeable membrane, the water is formed at the anode or hydrogen side of the membrane.

The reactions occurring at the electrodes causes electrons to be deposited on one electrode and removed from the other, and this provides the electromotive force of the cell. A significant advantage of the ion-exchange membrane type of cell is its ability to operate at room temperature and atmospheric pressure. Another important characteristic is its high volumetric efficiency.

However, prior to the present invention, the capability of high volumetric efficiency has not been exploited to its full advantage. That is, in general, when fuel cells of the membrane type are operated to provide their maximum output power, they may suffer serious degradation of operating characteristics, leading in some cases to a complete failure. This is a result of dehydration, which occurs in some membranes because of the large amount of heat generated in them when large currents are drawn from the cells in which they are used.

More particularly, the amount of fuel consumed by the fuel cell is in direct proportion to the electric current derived therefrom. Since the heat generated in the membrane increases with the fuel consumption, there is also an increase in the temperature differential between the membrane and the two heat sinks which are often used in cells of this type and are disposed opposite the two electrode surfaces, into which the heat is dissipated. This temperature drop exists across gaps adjacent the surfaces of the electrodes and between the electrodes and heat sinks, the gaps being the spaces through which the fuel and oxidant pass to reach these surfaces. In turn, the temperature gradients in the gaps cause migration of moisture from the membrane through the electrodes and across the gaps.

The rate at which the moisture leaves the membrane depends on the magnitude of the temperature gradients in the gaps and when the electric current drawn from the cell becomes sufficiently great, the temperature gradients are large enough to draw moisture from the membrane at a faster rate than it is supplied by the production of water at the electrode.

Under this condition, the membrane begins to dry out. This lowers the efficiency of the cell, causing an increase in the rate of heat generation. As a result, the rate of evaporation increases. If the cell is unattended, this circle of events continues until the membrane is completely dried, and the cell ceases to operate. This is tantamount to a total failure of the cell.

Various modifications of the fuel cell have been resorted to in an effort to overcome this problem. For example, in a hydrogen-oxygen cell in which the water is produced at the oxygen electrode, the fuel or hydrogen gap was decreased so that it was substantially narrower than the oxygen gap. It would be expected that a construction of this type would reduce moisture loss, since the narrowing of the hydrogen gap reduces the temperature of the membrane by decreasing the thermal impedance across the gap. Thus, the temperature gradient across this gap is relatively unchanged, as is the moisture loss on the hydrogen side of the membrane. On the other hand, with a lower difference in temperature between the membrane and the heat sink on the oxygen side, the temperature gradient across the oxygen gap is reduced, thereby reducing the moisture loss on the oxygen side. However, even with this construction, the membrane dries out when appreciable power is extracted from the fuel cell.

Other expedients of a similar nature have been tried. For example, the relative temperatures of separate heat sinks bordering on the hydrogen and oxygen gaps have been varied over wide ranges. However, prior to the present invention, none of these efforts have met with success.

It will be appreciated that this problem is not confined to ion-exchange membranes. Fuel cells using non-circulating liquid electrolytes also suffer from lack of control of their moisture content. In cells using electrolyte circulation systems, the water content of the electrolyte can be adjusted outside the cell, but where there is no such circulation, the problems set forth above are as pertinent as with ion-exchange membranes. That is, the problems are confronted by both the ion exchange membrane and the non-circulating liquid types of immobilized electrolytes.

Accordingly, it is an object of our invention to provide an improved fuel cell, of the type incorporating a non-circulating (or immobilized) electrolyte such as an ion-exchange membrane, and capable of unattendant operation for extended periods of time while retaining the desirable characteristics of fuel cells of this type.

A more specific object of the invention is to provide a fuel cell of the above type capable of continuous operation at greater current densities than prior membrane-type fuel cells.

Another object of the invention is to provide a fuel cell of the above type having a large reaction-site area for its size, and thus characterized by high volumetric efficiency.

A further object of the invention is to provide an improved fuel cell of the above type using hydrogen as its fuel.

Yet another object of the invention is to provide a fuel cell incorporating an ion-exchange membrane, which has effective control of the moisture content of the membrane.

A still further object is to provide a fuel cell of the above type which is useful as a laboratory instrument in analyzing and optimizing operation of ion-exchange membrane fuel cells.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

It should be noted that FIGURES 1, 2 and 3 are not drawn to scale, and they are qualitative rather than quantitative representations of the relationships demonstrated in them.

In general, the present invention makes use of a structure having a low resistance to the passage of gas through it while at the same time having a high thermal conductivity. This structure is disposed in one of the gas gaps at the surface of the electrode, e.g., the fuel gap. With the resulting high thermal conductivity across this gap, there is a negligible temperature gradient across it and thus practically no moisture leaves the surface of the electrode adjacent this gap. At the same time, the prorous nature of the structure permits an unimpeded flow of gas to the adjacent surface of the electrode, where one of the fuel cell reactions takes place. Furthermore, the active area of this surface is essentially the same as in the case of a gap containing only gas, and, therefore, the high-current-density characteristic of the ion-exchange membrane type of cell is retained.

With the moisture prevented from leaving one of the electrode surfaces, all of the moisture discharged from the ion-exchange membrane must leave by way of the other electrode surface. That is, in the present example, it flows across the oxygen gap. The temperature gradient in this gap can be adjusted, as before, by changing the width of the gap or by changing the temperature of the heat sink on the other side of the gap from the electrode. However, it will be noted that adjustments of this nature do not affect the flow of moisture across the hydrogen gap, because, by the nature of the latter gap, there can be no appreciable temperature differential across it. Therefore, the net rate of change of the moisture content of the membrane, i.e., the difference between the rate of water generation by the cell and the evaporation of water from the membrane, is readily controlled by adjustment of conditions in the oxygen gap. Ordinarily these conditions are set so that the rate of water generation equals the rate of evaporation when the cell is operating at or near its maximum efficiency.

Figure 1:
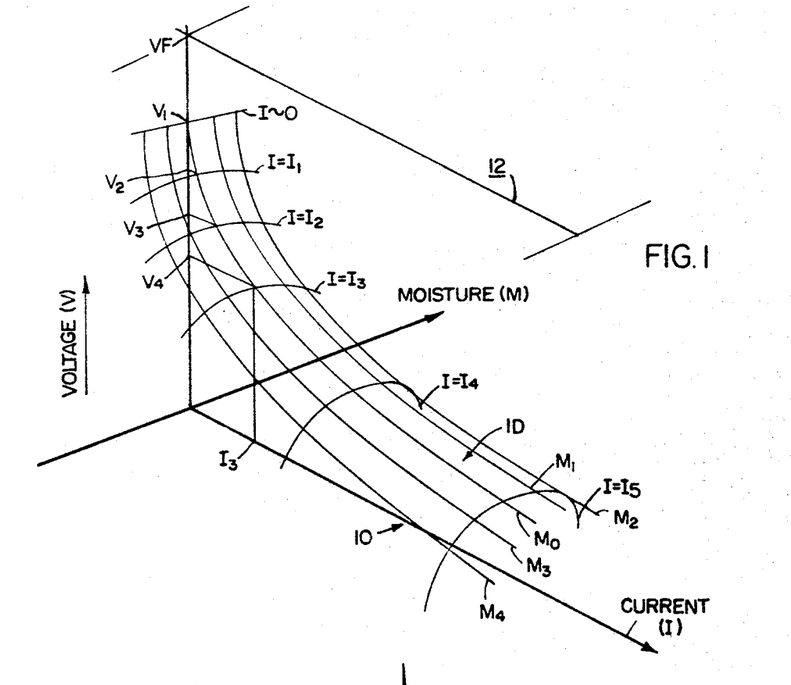
FIGURE 1 is a graphical representation of the interaction of output voltage, current and moisture conditions in a typical ion-exchange membrane fuel cell.
Figure 2:
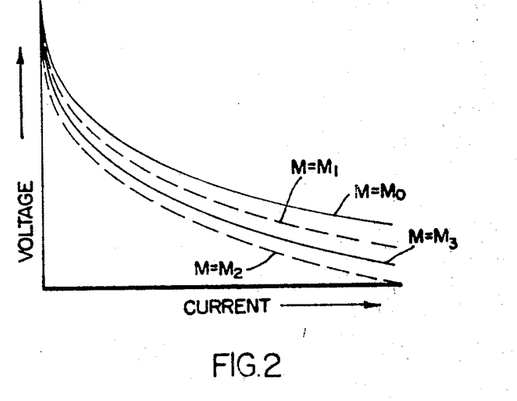
FIGURE 2 is a graphical representation of the voltage-current characteristics of the fuel cell; this figure is a projection of the curves of FIGURE 1 on the voltage-current plane therein.

FIGURE 1 is a three-dimensional representation of the interrelation of the voltage, current and moisture conditions in an ion-exchange membrane operating in a fuel cell. The moisture includes not only the water of hydration in the membrane but also additional moisture both within and on the surfaces of the membrane. The locus of the operating points of the fuel cell is a surface, generally indicated at 10, formed by the intersection of constant current lines I and constant humidity lines M. A constant voltage plane 12 represents the energy liberated by the chemical reaction taking place in the fuel cell. This energy corresponds to a potential $V_F$. The height of each point on the surface 10, i.e., its vertical distance along the voltage axis, represents the portion of the potential $V_F$ delivered to the output of the cell. Conversely, the vertical distance from the plane 12 of each point on the surface 10 represents the portion of the energy $V_F$ converted into heat in the ion-exchange membrane. Accordingly, the fuel consumption efficiency of the fuel cell is proportional to the output voltage.

More particularly, the fuel consumption efficiency, $n$, is defined by $$n = \frac{\text{electric power output}}{\text{fuel input}} = \frac{VI}{\text{fuel input}} \quad (1)$$

where, $V$ is the output voltage of the fuel cell, and
$I$ is the current.

However, the current is approximately proportional to the fuel input, i.e., $$\text{fuel input} = k_1 I \quad (2)$$

Therefore, $$n = \frac{VI}{k_1 I} = k_2 V \quad (3)$$

where $k_1$ and $k_2$ are constants of proportionality.

Thus, with reference to FIGURE 1, the efficiency, which is proportional to the output voltage, decreases as the current increases. Consequently, while the moisture produced in the cell increases in direct proportion to the current, the amount of heat generated in the ion-exchange membrane increases at a faster rate. In prior membrane type fuel cell constructions, when the current is increased beyond a critical point, the resulting imbalance between heat and moisture production results in the drying out of the membrane as discussed above.

In fact, with the gaseous gaps previously used adjacent on both electrodes, the output voltage of the fuel cell could not be reduced below about 0.85 volts, close to the practical maximum $v_1$ of 0.93 volt, without occurrence of the drying condition. On the other hand, the maximum power obtainable from a hydrogen-oxygen fuel cell of the ion-exchange membrane type corresponds to an output potential of the order of 0.5 volts, indicated at $V_4$ in FIGURE 1. This corresponds to current $I_3$.

Figure 4:
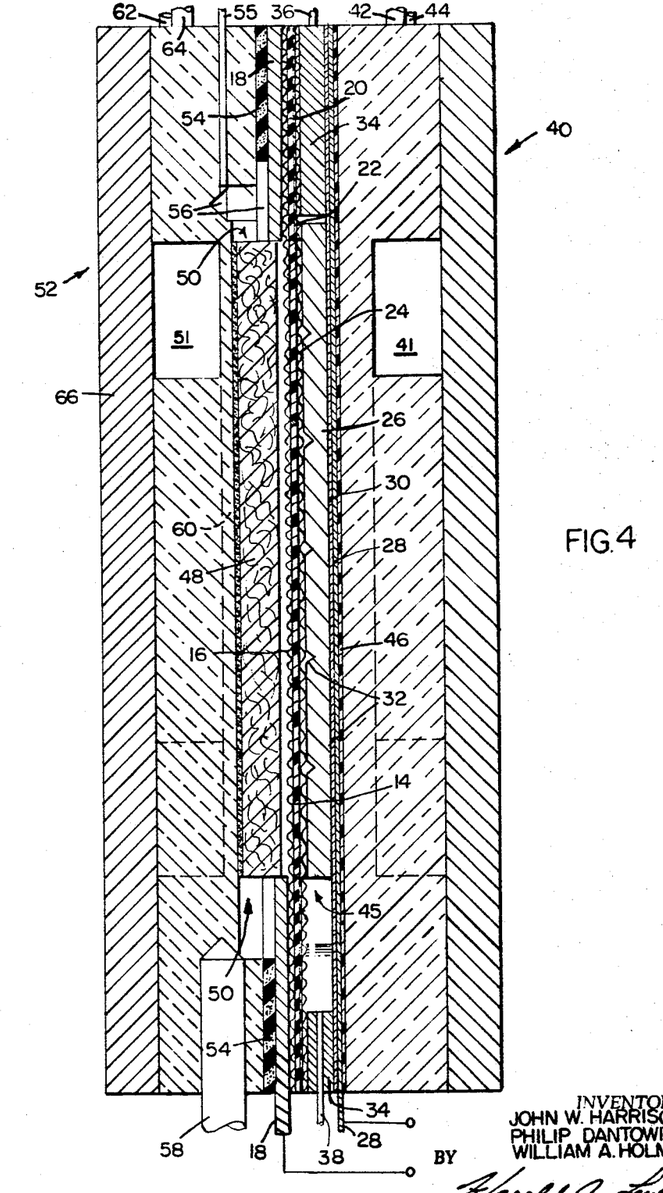
FIGURE 4 is a cross section of a cell embodying the invention.

In FIGURE 4 we have illustrated a fuel cell embodying the present invention. In the discussion of the cell it will be assumed that the ion-exchange membrane is of the cation-permeable type, in which water is produced at the cathode or oxygen side.

Figure 5:
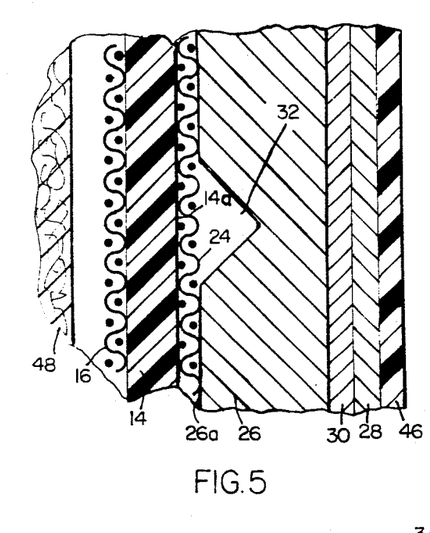
FIGURE 5 is an enlargement of a portion of the cell illustrated in FIGURE 4.

As shown in FIGURE 4 and the enlargement of FIGURE 5, the fuel cell includes an ion-exchange membrane 14, attached on one surface to a screen 16 which serves as one of the electrodes of the cell. The screen 16, in turn, is welded along its outer edges to a terminal member 18 which has the form of a frame around the membrane 14. The membrane 14 protrudes through a rubber gasket 20 and a thin plastic separator 22 and bears against a second screen 24, which serves as the other electrode of the fuel cell. Inasmuch as the recited relationship between the ion-exchange membrane 14 and the gasket 20 is conventional as illustrated, for example, in the Journal of the Electrochemical Society, vol. 109, No. 11, November 1962, Niedrach, "The Performance of Hydrocarbons in Ion Exchange Membrane Fuel Cells," and in the same journal, vol. 107, No. 2, February 1960, Grubb et al. "Batteries with Solid Ion-Exchange Membrane Electrolytes," and inasmuch as this relationship is not the subject of our invention, the relationship of the membrane and gasket is not shown in full detail in FIGURE 4.

The screen 24 is contacted over substantially all of its outer surface by a metallic heat transfer member 26. The member 26 provides a low resistance electrical connection between the screen 24 and a second terminal 28, by way of a backing plate 30 to which the member 26 is welded.

As shown in FIGURE 4, a major portion of the face 26a of the member 26 lies in contact with the screen 24. The face defines a series of intersecting grooves 32. These grooves permit the unimpeded circulation of the fuel, e.g., hydrogen, over the surface of the screen electrode 24 facing the member 26 where it is ionized in the vicinity of membrane surface 14a. In particular, the hydrogen easily reaches the reaction sites where the membrane 14 and the wires in the screen 24 touch each other (FIGURE 5), screens being inherently foraminous. It is at these reaction sites, and at similar reaction sites where the screen 16 and the membrane 14 are in contact, that the oxidation and reduction processes in the cell take place, with electrons being deposited on one of the screens and removed from the other.

More specifically, the heat transfer member 26 is surrounded by a frame 34 (FIGURES 4 and 6) whose inner edges are spaced from the edge of the member 26 to form a peripheral passageway around the member 26. The hydrogen is admitted to this passageway through tubes 36 and 38 extending through the frame 34. The gas then travels along the grooves 32 and through the interstices in the screen 24 to reach the various reaction sites. At the same time, heat from the membrane 14 passes through the screen 24 and member 26 to a heat sink which takes the form of a water jacket 40 in contact with the plate-like terminal member 28. The jacket 40 is provided with internal passages 41 through which water flows by way of inlet and outlet pipes 42 and 44.

The screen 24 is preferably formed from two screens (not shown individually) in face-to-face relationship, with one screen skewed with respect to the other so that the wires of the two screens are not parallel. This increases the effective reaction area on the hydrogen side of the membrane 14 to compensate for diminution of this area resulting from use of the member 26. Specifically, it provides additional paths through which gas, otherwise partially blocked by the surface 26a of the member 26, can reach the reaction sites.

Each of the screens forming the screen 24 may be screen formed with 0.003 inch wires. The heat transfer member 26 may have a thickness of 0.125 inch with the grooves 32 spaced apart 0.5 inch on centers. The grooves may be 0.030 inch deep and 0.060 inch across. With this construction, the effective conduction cross section for heat transfer from the ion-exchange membrane 14 to the water jacket 40 is of the order of 25% of surface area of the membrane. That is, the cross section is 25% of the cross section of a solid metallic member contacting the membrane 14 over its entire surface 14a.

The significant thermal conducting cross section of the structure within the hydrogen gap (generally indicated at 45), coupled with the high thermal conductivity of the member 26 and screen 24, results in a negligible temperature gradient across this gap. That is, the membrane 14 and the backing plate 30 on opposite sides of the hydrogen gap are at essentially the same temperature. Therefore, there is no significant flow of moisture across this gap from the membrane 14.

It will be noted that the temperature of the coolant flowing through the water jacket 40 is in general substantially less than the optimum operating temperature of the ion-exchange membrane 14. Accordingly, we prefer to dispose a sheet 46 of thermal insulating material between the water jacket and the terminal member 28. The thickness of the sheet is such as to impede the flow of heat from the membrane 14 to the jacket 40 sufficiently to provide the desired membrane temperature. That is, the flow of heat from the membrane 14 through the sheet 46 results in a temperature drop across the sheet which, when added to the temperature of the coolant in the jacket 40, provides the optimum membrane temperature. The temperature drop is across an element which is outside the hydrogen gap, and, therefore, it does not contribute to a flow of moisture from the ion-exchange membrane.

With further reference to FIGURE 4, the oxygen side of the fuel cell may include a wick 48 sufficiently close to the surface of the electrode 16 so as to absorb immediately any water formed at the reaction sites on the screen 16 which agglomerates into droplets. Since water droplets effectively change the width of the gap and hence the water vapor distribution, droplet formation should be prevented, and this is accomplished by the wick 48. The wick is enclosed within an oxygen gap 50 which has the form of a cavity within a water jacket assembly 52. The assembly 52 is separated from the terminal member 18 by a sponge rubber gasket 54. Oxygen enters the oxygen gap 50 through a tube 55 and proceeds to the reaction sites on the oxygen side of the membrane 14 by way of a peripheral passageway around the wick 48, through a channel-groove 56 in the tops of the cavity 50 and gasket 54, through the wick 48 itself and through the interstices in the screen 16. The water removed by the wick 48 drips to the bottom of the gap 50 and is removed therefrom by a tube 58.

The wick 48 may, of course, be omitted in favor of some other means of preventing standing water droplets, such as wetproofing the electrode surface to induce immediate runoff of the water.

The assembly 52 includes a partition plate 60 which separates the gap 50 from coolant passageways 51 interconnected by inlet and outlet pipes 62 and 64. The passageways within the assembly 52 are closed off by a cover plate 66.

To summarize operation of the fuel cell of FIGURE 4, hydrogen entering through the tubes 36 and 38 travels to the reaction sites in the vicinity of where the screen 24 contacts the membrane 14. Oxygen entering through the tube 55 similarly proceeds to the reaction sites in the vicinity defined by the screen 16 and membrane 14. At the respective reaction sites, the hydrogen and oxygen are ionized by the catalytic action of the screen electrodes, which may be made of platinum for this purpose, and ions containing hydrogen proceed through the membrane to the oxygen side where they combine with the ionized oxygen to form water. The ionization processes result in the deposition of electrons on one of the electrode-screens and removal of the electrons from the other, resulting in an output potential appearing at the terminal members 18 and 28.

At the same time, evaporation of moisture from the surface 14a of the ion-exchange membrane through the electrode is prevented by virute of the negligible temperature drop across the hydrogen gap 45 defined by the electrode 24 and the backing plate 30. The rate at which moisture is removed from the oxygen side of the membrane 14 depends on the difference between (1) the temperature of the membrane and (2) the temperature of the heat sink represented by the cooled partition plate 60. Of these two factors, the temperature of the membrane is a function of the thermal resistance of the sheet 46 and the temperature of the heat sink on the hydrogen side, i.e., the water jacket 40. The temperature of the plate 60 is essentially the temperature of the heat sink on the oxygen side.

Thus, given the optimum operating temperature of the membrane 14 and the temperature gradient across the oxygen gap, i.e., between the membrane 14 and the plate 60, the temperature of the coolant flowing through the assembly 52 is determined. If the same coolant is used in the water jacket 40, the thickness of the insulating sheet 46 may be adjusted to provide the desired membrane temperature.

It will be noted that a certain amount of heat outflow from the membrane 14 takes place through the terminal member 18. This is kept at a minimum by the relatively low thermal cross section for heat leaving the membrane in this direction. The heat must travel a substantial distance longitudinally in the wires constituting the screen 16, and also, in the membrane, it must travel in a planar direction. This direction of travel has as its cross section the small thickness of the membrane.

It is desirable that most of the heat leaving the membrane 14 travel perpendicularly to the surfaces thereof and, in particular, that the flow of heat from the membrane not be limited to relatively small regions thereof. Otherwise, there will be substantial flow of heat to these regions from the other regions of the membrane, thereby creating significant temperature differentials over the surfaces of the membrane. Thus, some portions of the membrane may be at the optimum operating temperature while others are at temperatures substantially different therefrom.

Of even greater importance when substantial current is drawn from the fuel cell, there will be migration of moisture from the hotter to the colder portions of the membrane, and the additional heat corresponding to the higher current condition will cause a drying up of the hotter portions and a concomitant deposition of moisture on the cooler portions. On the other hand, with the construction described herein, the temperature of the membrane 14 does not vary substantially over the surface thereof, particularly under high current conditions, and the moisture content is therefore relatively uniform throughout the membrane.

It is presently believed that when appreciable current is drawn from a membrane type fuel cell, maximum fuel consumption efficiency is obtained when the moisture content of the membrane plus electrodes is equal to the water of hydration of the membrane thereof, that is, when the membrane is internally saturated with water and there is no excess water on the surfaces of the electrodes. The reason for this theory is that when there is excess moisture, i.e., an accumulation on the surfaces of one (or both) of the electrodes, the gaseous reagent reacting at that surface must travel through the liquid to reach the reaction sites. The water impedes the flow of the gas and in so doing reduces the output voltage of the fuel cell.

On the other hand, a partial drying out of the membrane, which reduces its moisture content below the water of hydration, impedes the passage of ions through the membrane. It should also be borne in mind that a partial drying out of the membrance will in some cases reduce the number of reaction sites, since moisture is required for the reactions at these places.

It will be observed that it is generally preferable to remove the moisture from the side of the membrane where it is produced, since, if it is removed from the other side, there may be a slight excess of moisture on the first side and a slight drying condition on the second side.

While the above theory concerning optimum moisture content is believed to be correct, the operation of the fuel cell and the moisture control systems described herein do not depend on this theory. However, the regulation of moisture content to improve fuel consumption efficiency at a given power output does depend on the fact that there is an optimum moisture content, whatever its value may be.

More specifically, with reference to FIGURE 1, the height of the surface 10 is greatest, and therefore the fuel consumption efficiency of the fuel cell is greatest, along the line corresponding to a moisture content $M_0$.

The efficiency drops as the moisture is increased from the value $M_0$, e.g., corresponding to the lines $M_1$ and $M_2$. It also drops when the moisture is decreased, e.g., to the values $M_3$ and $M_4$. It is believed that the moisture content $M_0$ corresponds to the optimum moisture condition discussed above.

Figure 3:
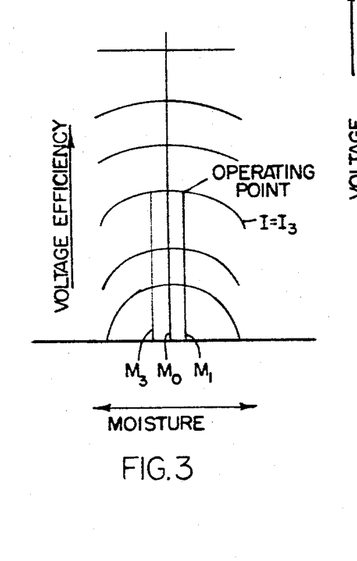
FIGURE 3 is a graphical representation of a portion of the voltage-moisture characteristic of the fuel cell; this figure is a projection of the $I=I_3$ curve of FIGURE 1 on the voltage-moisture plane therein.

FIGURE 3 illustrates the variation in efficiency and output voltage of the fuel cell as a function of moisture content when the output current has the value $I_3$, corresponding to maximum power output. Preferably, the temperature of the partition plate 60 (FIGURE 4) is adjusted so that the moisture content of the ion-exchange membrane 14 is slightly on the wet side, that is, the moisutre has a value $M_1$ slighlty greater than the optimum efficiency value $M_0$.

More particularly, with these values of current and moisture, the heat generated in the membrane 14 corresponds to a certain temperature difference between the membrane and the heat sink on the hydrogen side for any given value of the thermal impedance of the sheet 46. Thus, control of the temperature of the hydrogen side heat sink may be used to provide the optimum temperature of the ion-exchange membrane at $I=I_3$ and $M=M_1$. At the same time, the temperature gradient across the oxygen gap 50 is adjusted so that moisture is evaporated from the membrane 14 at the same rate at which it is produced by the fuel cell reaction for these values of current and moisture content. These conditions can be obtained simultaneously either by separately adjusting the effective coolant temperatures in the water jacket 40 and water jacket assembly 52 or, if the collant temperature is the same on both sides of the membrane, by adjusting both this temperature and the thickness of the sheet 46. Also, the thickness of the oxygen gap 50 may be varied to arrive at the desired temperature gradient therein.

With this arrangement, the operating point of the fuel cell is inherently stable at the operating point shown in FIGURE 3, i.e., $M=M_1$. If the fuel consumption efficiency should increase slightly, the heat generated in the ion-exchange membrane will decrease, thereby decreasing the temperature of the membrane and decreasing the temperature gradient in the oxygen gap. This will reduce the rate at which the moisture is removed from the ion-exchange membrane, and the resulting increase in moisture content will cause a decrease in efficiency, with the operating point shifting to the right in FIGURE 3. This counteracts the increase in efficiency and thereby tends to return the output voltage to its prior level.

Similarly, should the efficiency undergo a slight decrease, the resultant increase in the temperature in the ion-exchange membrane will increase the moisture transfer rate. The net moisture content will decrease, thereby shifting the operating point to the left (FIGURE 3) and thus increasing the efficiency and tending to cancel the original decrease thereof.

Accordingly, the operating point of the fuel cell is stable, and the drying condition, resulting in breakdown, will not occur.

This type of operation also improves the voltage regulation of the fuel cell. An increase in current decreases the efficiency of the cell, thereby decreasing the moisture content. The corresponding shift of the operating point to the left in FIGURE 3 increases the output voltage above the value it would have without this self-regulating feature. A decrease in current will result in a shift in the opposite direction. It is noted that there is a limit to the current variation which can be accommodated about any given initial operating point. If the current is increased sufficiently to reduce the moisture content below the value $M_0$, so that operation is in the region to the left of the ordinate in FIGURE 3 an unstable condition results and the cell may completely dry up.

That is, when the operating point shifts to a moisture content less than $M_0$, for example, to the value $M_3$, a decrease in efficiency causes, as before, an increase in the rate at which moisture is removed from the ion-exchange membrane. However, this shifts the operating point further to the left, in the direction of even less efficiency. The result is a still further increase in the moisture removal rate. This is the run-away condition described above, and total failure of the fuel cell may well result.

The reason for arranging the operating point slightly on the wet side of $M_0$ will now be apparent. This point should be located as close to $M_0$ as possible, for maximum efficiency, while providing enough leeway for expected variations in output current.

Figure 7:
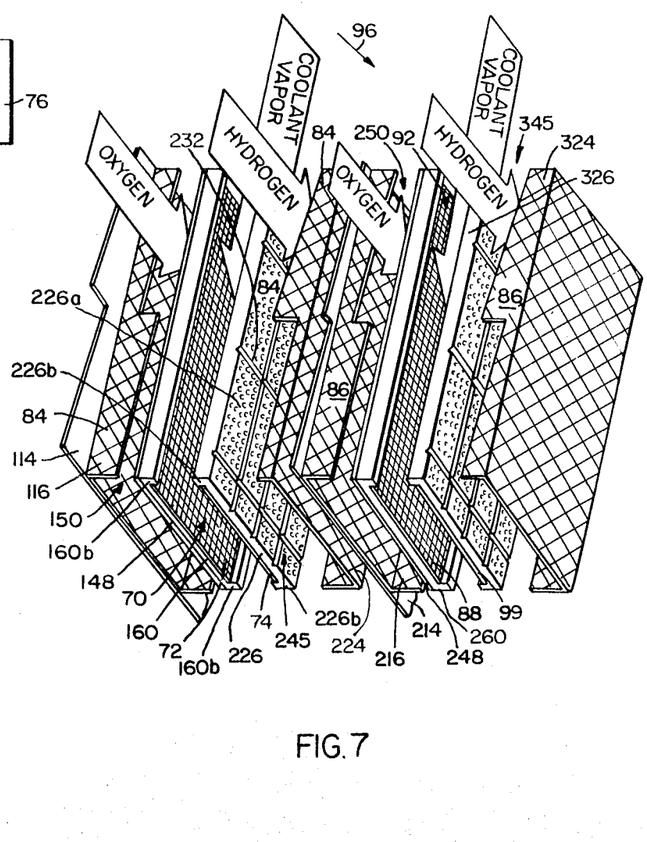
FIGURE 7 is an exploded view of a portion of a stack of fuel cells embodying our invention.

FIGURE 7 is an exploded view of a modified construction which is suitable for stacking a number of fuel cells to provide increased voltage capability. The illustrated unit includes portions of three fuel cells connected in series so that their voltages are added. The construction of each cell is similar to that of FIGURE 4 and therefore, similar reference numerals are used, where applicable, with distinguishing prefixes.

Beginning at the left end of the unit shown in FIGURE 7, the first component is an ion-exchange membrane 114, in contact with a screen 116 which borders on an oxygen gap 150. Across the gap 150 is a partition plate 160 with a wick 148 attached to the left hand-surface thereof. To the right of the plate 160 is a heat transfer member 226 whose right-hand surface borders on a hydrogen gap 245 associated with an ion-exchange membrane shown at 214. The membrane 214 has a screen 224 in contact with the member 226.

Figure 8:
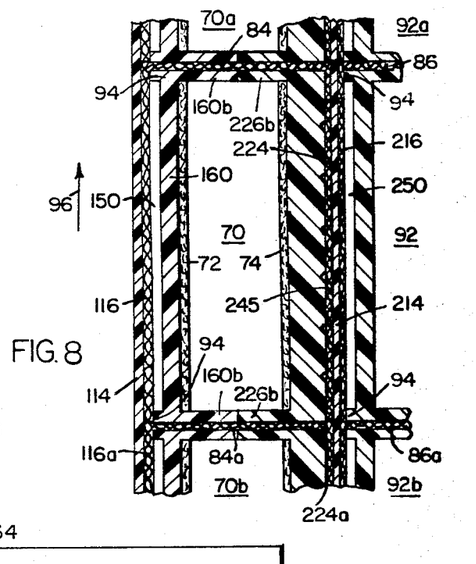
FIGURE 8 is a sectional view of part of the stack shown in FIGURE 7.

As seen in FIGURES 7 and 8, the plate 160 and member 226 are provided with contiguous flanges 160b and 226b, respectively, so as to form a coolant channel 70. A suitable coolant passing through this channel, serves as a heat sink for both the oxygen gap 150 of the leftmost fuel cell in the stack and the hydrogen gap 245 of the next fuel cell.

Figure 6:
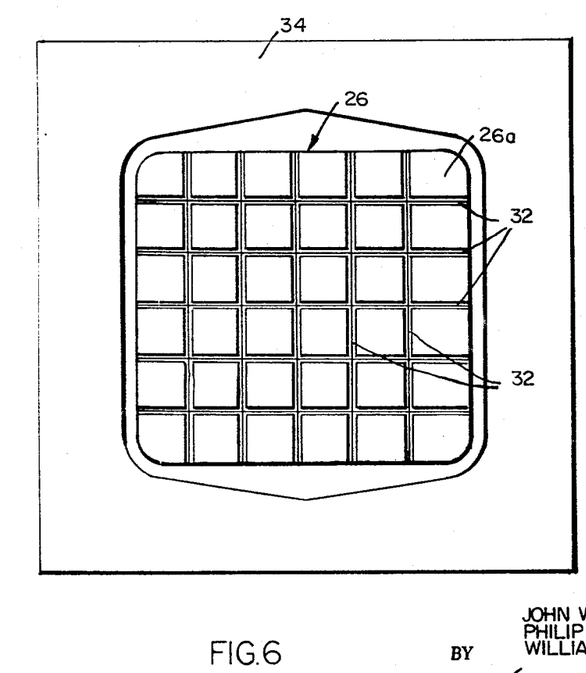
FIGURE 6 is an elevational view of the heat transfer member used in the fuel cell.

The plate 160 and heat transfer member 226 of FIGURES 7 and 8 may differ somewhat from their counterparts in FIGURES 4–6. Specifically, they may be of a suitable plastic material, which is extruded to provide a unitary construction. The grooves 232 may then be formed by machining or embossing procedures. The member 226 is thicker than the plate 160, since there should be a greater temperature drop across the member 226. That is, the fuel and oxygen sides of the membranes 114 and 214 have the same heat sink temperature; yet, as pointed out above, the temperature of the surface 226a of the member 226 should be the same as that of the membrane 214, while the temperature of the left-hand surface of the plate 160 should be less than that of the membrane 114 with the same heat sink temperature. The greater temperature drop across the member 226 provides the desired higher temeprature of the surface 226a.

In this connection, it is noted that the plate 160 should be as thin as practicable in order to minimize the temperature drop across it, i.e., facilitate the conduction of heat through it.

In order to ensure uniformity of temperature over the surface 226a of the member 226, this surface may take the form of a metallic coating. The high thermal conductivity of the metal constrains the entire surface to be at the same temperature as the screen 224 and thus ensures a lack of significant thermal gradients within the fuel gap 245.

The portions of the surface 226a between the grooves 232 are preferably "dimpled" so as to provide a fairly large number of evenly distributed projections and depressions. The depressions are interlinked to provide channels which distribute fuel from the grooves 232 over the remainder of the surface 226a. This greatly facilitates the flow of fuel to all portions of the screen 224 contacting the ion-exchange membrane 214 and thus eliminates any need for a double screen construction of the type described above.

With further reference to FIGURE 7 the surfaces of the channel 70 are preferably lined with wicks 72 and 74. The wicks serve to provide uniform cooling of the surfaces of the plate 160 and member 226, to which they are attached, and thereby optimize performance over the entire areas of the respective fuel cells with which they are associated.

Figure 9:
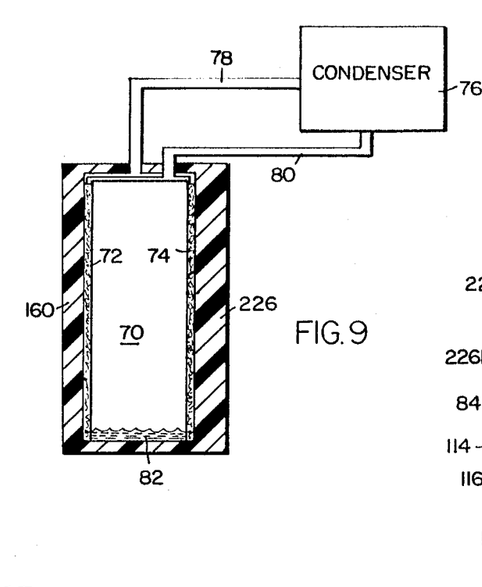
FIGURE 9 is a schematic illustration of a cooling system which may be used with fuel cells.

More specifically, as shown in FIGURE 9, the channel 70 may be connected in a closed cooling system including a condenser 76 and conduits 78 and 80 connecting the input and output respectively of the condenser to the cooling channel. The atmosphere within the channel 70 consists of the gaseous coolant substantially in equilibrium with the liquid phase (indicated at 82) at the bottom of the channel. Because the atmosphere within the channel 70 is saturated, there is a migration of the gaseous coolant from the channel 70 to the condenser 76 by way of the conduit 78, inasmuch as the condenser is at a temperature somewhat lower than the temperature in the channel.

More specifically, the temperature of the condenser 76 is below the dew point of the atmosphere within the channel 70 and conduit 78 and therefore the coolant condenses to the liquid phase within the condenser. This liquid then passes through the conduit 80, from which it drips down onto the wicks 72 and 74 to keep them saturated. Thus, heat is removed from the plate 160 and member 226 by evaporation of the coolant from the wicks 72 and 74; and, the heat of vaporization is then removed from the coolant in the condenser 76.

The rate at which heat is removed by the condenser 76 depends on the temperature thereof. Specifically, if the temperature is reduced, the condensation will take place more rapidly, with a resulting increase in the flow of the coolant vapor from the channel 70 to the condenser. This, inturn, lowers the pressure in the channel and thereby increases the rate of evaporation from the wicks 72 and 74, with a concomitant decrease in the temperature of the surfaces of the plate 160 and member 226 exposed to the wicks.

An important advantage of the cooling system shown in FIGURES 7–9 is the uniformity of the temperature over the cooled surfaces. If the plate 160 and member 226 are cooled directly by a coolant flowing through the channel 70, the coolant entering the channel may be significantly cooler than the coolant leaving the channel unless an inordinately high flow rate is maintained. Thus, the temperatures of the cooled elements will be less at the end of the channel 70 where the coolant enters than the end from which it leaves. On the other hand, with the system illustrated in FIGURES 7–9, the temperature at any point depends solely on the pressure of the coolant gas at that point, assuming that the liquid is at the boiling point. The pressure varies only slightly from one end of the channel 70 to the other end; therefore, the temperature is uniform.

The screens 116 and 224 are preferably an integral unit formed with an intermediate or connecting section 84 extending around the plate 160 and heat transfer member 226 along one side thereof. The section 84 provides a series electrical connection between the fuel cell incorporating the ion-exchange membrane 114 and the cell incorporating the membrane 214.

The stacking arrangement of FIGURE 7 also includes an electrode screen 216 imbedded in the right-hand surface of the membrane 214. A partition plate 260, spaced from the screen 216 to form an oxygen gap 250 completes the fuel cell incorporating this membrane. Succeeding components in the unit are a heat transfer member 326 which forms a coolant channel 92 with the plate 260, and an electrode screen 324 embedded in the next ion-exchange membrane (not shown). The screens 216 and 324 are interconnected by a section 86 similar to the connecting section 84, and this puts the next fuel cell (incorporating the screen 324) in series with the two left-hand cells of the stack. A wick 248 is affixed to the surface of the plate 260 exposed to the oxygen gap 250.

Wicks 88 and 99 are affixed to the surfaces of the plate 260 and heat transfer member 326 defining the coolant channel 92, for operation in the manner described above.

FIGURE 8 shows in detail the manner in which the various components of the stack of FIGURE 7 are maintained in the proper special relationship. Specifically, ridges 94 extend from the plates 160, 260, etc., to the screens 116, 216, etc., to maintain the desired widths of the oxygen gaps 150, 250, etc. The entire stack is clamped together by a suitable clamping arrangement (not shown) to maintain adjacent parts in contact with each other.

In order to prevent leakage between the oxygen gap 150 and hydrogen gap 245 by way of the section 84 connecting the screens 114 and 224, the flanges 160b and 226b preferably extend through the interstices of this section. For this purpose, it may be convenient to form the flanges in two portions, one of which consists of a material which impregnates the screen section 84 and is bonded to the portions of flanges 160b and 226b shown separately in FIGURE 8.

FIGURE 8 also illustrates the series connection of fuel cells stacked according to FIGURE 7. The current capacity of the system shown in FIGURE 7 can be increased by extending the stack in the direction of the channels 70 and 92, and also by extending it transversely to this direction, i.e., by widening the channels in the direction of the arrow 96. Space requirements often dictate extension in both directions.

However, there is a practical limit to increasing the width in the direction of the arrow 96. As the width increases in this direction, the current density in the electrode-screens and the connecting sections 84 and 86 also increases. If this increase is carried too far, the resulting voltage drop in these parts materially decreases the output voltage of the stack. It also increases the internal power dissipation. This problem is overcome by the construction shown in FIGURE 8.

More specifically, the ion-exchange membranes 114 and 214 extend along the full width of the stack in the direction of the arrow 96, but the screens 116 and 224 do not. Rather, the screens are connected by the section 84 at one end, and they terminate at the opposite ends of the plate 160 and members 226. At the latter end they adjoin screens 116a and 224a, interconnected by a section 84a. The screens 116a and 224a extend along the membranes 114 and 214 on opposite sides of a channel 70b. The channel 70b is enclosed by a partition plate and heat transfer member similar to those of the channel 70, and it is associated with fuel cells identical to the cells common to the channel 70. Channels shown fragmentarily at 70a, 92a and 92b are also parts of identical fuel cells.

With this arrangement the total current generated by the stack is divided among a plurality of connecting sections at each level, e.g., the sections 84 and 84a, connecting the adjacent fuel cells in series. The voltage drop across the connecting sections is substantially less than it would be if only a single section were used. Moreover, the electrical path lengths in the electrode-screens are reduced. That is, the average path length from a point on one screen to a point on the screen connected thereto is less than in the case of a single connecting section between the screens. This also results in a lower voltage drop.

To facilitate fabrication of the construction shown in FIGURE 8, each of the electrode-screens is preferably of a double-screen construction. A first screen is embedded in an ion-exchange membrane. A second screen, contacting the first one over the face thereof, forms part of the U-shaped unit including a connecting section, e.g., the section 84. The screens embedded in the ion-exchange membranes may then extend the full length of the membranes.

With further reference to FIGURES 7 and 8, the fuel gaps 245 and 345 may be supplied by a manifold (not shown) connected to the tops thereof (FIGURE 7). The bottoms of these gaps are suitably sealed. The gaps 150 and 250, on the other hand, are preferably open to the atmosphere surrounding the stack. Specifically, it is contemplated that the stack be housed in an enclosure containing oxygen. The condensed water then drops from the oxygen gaps into the enclosure. The channels 70, 92, etc., should be sealed to isolate the cooling system from the rest of fuel cell stack.

Thus, we have described in detail an improved fuel cell of the ion-exchange membrane type. A medium having high thermal conductivity is disposed in the gap on one side of the membrane so as to provide a negligible temperature gradient across the gap. As a result, the membrane does not lose moisture into this gap, and all the moisture leaving the membrane passes into the gap on the other surface thereof. The temperature gradient across the latter gap can be set at a value providing equilibrium of the moisture content of the membrane.

The moisture content of the membrane and the temperature thereof are readily adjusted to their optimum values. As described above, this can be accomplished without the use of external control devices, by arranging the moisture content to be slightly in excess of its optimum value.

While the invention has been described with specific reference to a cell using an ion-exchange membrane, it is fully applicable to other electrolytes. In particular, it may be used with liquid electrolytes, particulary where external means for replenishing or extracting water from the electrolyte are not utilized. In this connection, it is noted that regardless of whether a membranous or liquid electrolyte is used, the entire structure containing the electrolyte may be termed an "electrolytic member."

It will also be apparent that the invention may be used in cells in which the reaction product is a liquid, other than water, acting as an ionizing agent in the electrolyte. Furthermore, an oxidant other than oxygen and a fuel other than hydrogen may be used.

Moreover, while the foregoing description specifically relates to a fuel cell in which water is formed on the surface of the electrolytic member facing the oxidant gap, the invention is equally applicable to cells forming water at the surface facing the fuel gap. In the latter case, it may be desirable to remove the reaction product from the fuel side and provide the oxidant gap with the high thermal conductance (i.e., low thermal impedance) discussed above.

We have also described a construction by which individual fuel cells may be stacked in an efficient, space-saving arrangement to provide an increased output voltage.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. In a fuel cell incorporating a non-circulating electrolyte, the combination comprising
   immobilized electrolyte means for providing ionic conductivity between a first surface area at which a first fluid reactant is ionized and an opposed second surface area at which ions derived from the first fluid reactant form a reaction product with a second fluid reactant,
   a thermally conductive imperforate member overlying said first surface areas and spaced therefrom, said member having a face defining a plurality of grooves opening toward said first surface area, means for delivering the first fluid reactant to the grooves, interposed between and in contact with a major portion of face and said first surface area, thermally conductive fluid pervious foraminous means for allowing the first fluid reactant to be distributed from the grooves over said first surface area while simultaneously thermally equilibrating said member and said first surface area, and cooling means lying in thermally conductive relation with said member constructed and arranged for contact with a coolant meduim for dissipating heat from said electrolyte means through said first surface area, said fluid pervious means, and said member.

2. A combination according to claim 1 in which said thermally conductive, fluid pervious means includes a screen.

3. A combination according to claim 1 in which said thermally conductive, fluid pervious means is comprised of two screens, one of said screens being skewed with respect to the other.

4. The combination according to claim 1 additionally including means for delivering the second fluid reactant to said second surface area of said electrolyte means, and wicking means supported by said delivering means in contact with the second fluid reactant and spaced from said second surface area.

5. In a fuel cell, the combination comprising an ion exchange membrane providing ionic conductivity between a first surface area at which a first fluid reactant is ionized and an opposed second surface area at which ions derived from the first fluid reactant form water as a reactant product with a second fluid reactant, a thermally conductive imperforate member overlying said first surface area and spaced therefrom, said member having a face defining a plurality of grooves opening toward said first surface area, means for delivering the first fluid reactant to the grooves, interposed between and in contact with a major portion of face and said first surface area, thermally conductive fluid pervious foraminous means for allowing the first fluid reactant to be substantially uniformly distributed from the grooves over said first surface area while simultaneously thermally equilibrating said member and said first surface area, cooling means lying in thermally conductive relation with said member constructed and arranged for contact with a coolant medium for dissipating heat from said ion exchange membrane through said first surface area, said fluid pervious means, and said member, and means forming a moisture reservoir spaced from said second surface area.

6. A combination according to claim 5 in which said electrolyte means is a cation exchange membrane, the first reactant is an oxidizable fuel, and the second reactant is a reducible fuel.

7. In a fuel cell stack, the combination comprising first and second immobilized electrolyte means each for providing ionic conductivity between a first surface area at which a first fluid reactant is ionized and an opposed second surface area at which ions derived from the first fluid form a reaction product with a second fluid reactant, a thermally conductive, fluid pervious foraminous means overlying said first surface area of said first electrolyte means, a first thermally conductive imperforate member, said first member having a face defining a plurality of grooves opening toward said first surface area of said first electrolyte means, a major portion of said face contacting said fluid pervious means, a second thermally conductive member, means mounting said second member spaced from said first member to form a coolant channel therebetween, means for circulating coolant through said channel, and means spacing said second member from said second surface area of said second electrolyte means to permit the second fluid reactant to contact said second surface area of said second electrolyte means.

8. The combination according to claim 7 in which said first and second thermally conductive members and said means mounting said members in spaced relation are integrally joined to form a tubular coolant flow channel.

9. The combination according to claim 7 in which said fluid pervious means additionally lies adjacent said second surface area of said second electrolyte means and electrically connects said electrolyte means in series.

10. The combination according to claim 7 additionally including wicking means supported by said second member spaced from said second surface of said second electrolyte means.

References Cited

UNITED STATES PATENTS

| | | | |
|---|---|---|---|
| 409,366 | 8/1889 | Mond et al. | 136—86 |
| 2,691,628 | 10/1954 | Annerud | 204—258 X |
| 2,881,123 | 4/1959 | Zdansky | 204—256 |
| 3,005,943 | 10/1961 | Jaffe | 136—86 X |
| 3,012,086 | 12/1961 | Vahldieck | 136—86 |
| 3,234,050 | 2/1966 | Beltzer et al. | 136—86 |
| 2,175,523 | 10/1939 | Greger | 136—86 |
| 3,101,285 | 8/1963 | Tantram et al. | 136—86 |
| 3,146,131 | 8/1964 | Linden et al. | 136—86 |
| 3,172,784 | 3/1965 | Blackmer | 136—86 |
| 3,186,872 | 6/1965 | Ewing | 136—86 |

OTHER REFERENCES

Oster, E.A., Cation-Exchange Membrane Fuel Cells, in "Proceedings 14th Annual Power Sources Conference," May 1960, U.S. Army Signal Development Laboratory, Fort Monmouth, N.J. (Only pp. 59–62 relied on), TJ 153 p. 6 (Copy in Scientific Library).

ALLEN B. CURTIS, *Primary Examiner.*

UNITED STATES PATENT OFFICE
CERTIFICATE OF CORRECTION

Patent No. 3,392,058                                         July 9, 1968

John W. Harrison et al.

It is certified that error appears in the above identified patent and that said Letters Patent are hereby corrected as shown below:

Column 13, line 36, "reactant", second occurrence, should read -- reaction --. Column 14, line 8, after "fluid" insert -- reactant --.

Signed and sealed this 2nd day of December 1969.

(SEAL)
Attest:

Edward M. Fletcher, Jr.                              WILLIAM E. SCHUYLER, JR.
Attesting Officer                                                 Commissioner of Patents